(12) United States Patent
Odell

(10) Patent No.: US 6,473,167 B1
(45) Date of Patent: Oct. 29, 2002

(54) POSITION AND ORIENTATION DETERMINATION USING STATIONARY FAN BEAM SOURCES AND ROTATING MIRRORS TO SWEEP FAN BEAMS

(75) Inventor: Don Odell, Milton, VT (US)

(73) Assignee: Ascension Technology Corporation, Burlington, VT (US)

( * ) Notice: Subject to any disclaimer, the term of this patent is extended or adjusted under 35 U.S.C. 154(b) by 0 days.

(21) Appl. No.: 09/880,146

(22) Filed: Jun. 14, 2001

(51) Int. Cl.[7] ............................. G01B 11/26; G01C 1/00
(52) U.S. Cl. ............................. 356/141.4; 356/139.03
(58) Field of Search .......................... 356/141.4, 141.1, 356/139.03

(56) References Cited

U.S. PATENT DOCUMENTS

| | | | |
|---|---|---|---|
| 3,375,375 A | * | 3/1968 | Abbey et al. |
| 4,123,165 A | * | 10/1978 | Brown et al. |
| 4,373,808 A | * | 2/1983 | Pell et al. |
| 5,100,229 A | * | 3/1992 | Lundberg et al. |
| 5,110,202 A | * | 5/1992 | Dornbusch et al. |
| 5,128,794 A | * | 7/1992 | Mocker et al. |
| 5,187,540 A | * | 2/1993 | Morrison |
| 5,742,394 A | * | 4/1998 | Hansen ........................ 356/375 |

FOREIGN PATENT DOCUMENTS

EP 0493651 * 7/1992

\* cited by examiner

Primary Examiner—Stephen C. Buczinski
(74) Attorney, Agent, or Firm—H. Jay Spiegel

(57) ABSTRACT

Position and orientation determination uses stationary fan beam sources and rotating mirrors to sweep fan beams. In a first embodiment, a single motor has an elongated drive shaft with mirrors mounted on it, the reflective faces of which lie either in common planes or face in opposite directions. Fan beams are generated by stationary laser beam sources aimed at each mirror. As the mirrors rotate, each stationary source is reflected off a particular mirror and into a measuring space in a predictable pattern of movement. Electrical circuitry is provided with knowledge of the rotative position of the mirrors at any given time. A sensor attached to the object to be measured detects time of arrival of impinging scanning beams. At least one of the fan-shaped beams is skewed with respect to other beams, and at least two of the fan-shaped beams have origins sufficiently separated to allow accurate triangulation of the position and orientation of the sensor over various regions of the measuring space. In this way, accurate measurement of position and orientation may be carried out. In a second embodiment, separate drive motors are provided, each of which carries a mirror with the drive shafts of the motors preferably being parallel to one another and with the reflective surfaces of the mirrors lying in either common planes or parallel planes. A method is also disclosed.

36 Claims, 6 Drawing Sheets

POSITION AND ORIENTATION DETERMINATION USING STATIONARY FAN BEAM SOURCES AND ROTATING MIRRORS TO SWEEP FAN BEAMS

BACKGROUND OF THE INVENTION

The present invention relates to position and orientation determination using stationary fan beam sources and rotating mirrors to sweep fan beams. The present invention has applications in diverse areas such as medicine, aerospace, and virtual reality. Additionally, the present invention may be employed for position and orientation monitoring of surgical instruments, for cockpit-based helmet mounted siting mechanisms, and for augmented reality computer-aided design.

It is generally known in the prior art to provide a system in which position and orientation measurements are carried out using multiple scanning beams in a reference frame and multiple detectors mounted on a movable object. An example of such a system is disclosed in U.S. Pat. No. 5,767,960 to Orman. Such systems measure beam times of arrival and compute the positions of the various detectors using a technique known as triangulation.

In the prior art, systems have employed the use of three scanning fan-shaped beams, each of which originates from a separate scanning mirror station which deflects the fan beams across a measurement space. The cost and complexity of multiple scanning units makes these approaches commercially impractical. Applicant is aware of the following U.S. Patents:

U.S. Pat. No. 5,100,229 to Dornbusch
U.S. Pat. No. 5,128,794 to Mocker
U.S. Pat. No. 5,187,540 to Morrison
U.S. Pat. No. 5,268,734 to Parker
U.S. Pat. No. 5,767,960 to Orman.

Parker and Dornbusch use three scanner mirrors and laser sources to measure angles of inclination from three source points. Orman measures position of a detector using three fan beams rotating about one axis but Orman requires an awkward arrangement of optical fan beam sources with the sources rotating about a common axis.

The present invention differs from the teachings of the prior art listed above in that, in the present invention, the fan beam sources are stationary and are directed toward one or more rotating mirrors with the fan beams reflected from the mirrors moving through a measuring space in a controlled predictable manner.

SUMMARY OF THE INVENTION

The present invention relates to position and orientation determination using moving means comprising stationary fan beam sources and rotating mirrors to sweep fan beams. The present invention includes the following interrelated objects, aspects and features:

(1) In a first embodiment, motor means comprises a single motor having drive shaft means comprising an elongated drive shaft. In one aspect, the drive shaft has preferably mounted thereon reflector means comprising two mirrors, the reflective faces of which lie in common planes. If desired, the reflector means can comprise a single elongated mirror. In any event, the reflective surfaces thereof should be in a common plane.

(2) In the preferred embodiment of the present invention, each reflective face of each mirror is generally rectangular and the reflective faces or facets face in diametrically opposite directions spaced 180° apart. If desired, the shaft may be provided with a single elongated mirror having one or more faces or some amount of mirrors greater than two mirrors. If desired, four reflective faces spaced 90° apart may be employed.

(3) Fan beams are generated in the first embodiment through the use of stationary laser beam sources which are aimed at each mirror. As the mirrors rotate, each stationary source is reflected off a particular mirror and into a measuring space in a predictable pattern of movement.

(4) The control means incorporated in the first embodiment of the present invention is provided with knowledge as to the rotative position of the mirrors at any given time.

(5) Sensor means comprising a sensor is attached to the object to be measured, which sensor is able to detect the time of arrival of impinging scanning beams. At least one of the fan-shaped beams is skewed with respect to other beams, and at least two of the fan-shaped beams have origins sufficiently separated to allow accurate triangulation of the position of the sensor over various regions of the measuring space. In this way, accurate measurement of position and orientation may be carried out.

(6) Computing means determine reflected fan beam planes from knowledge of incident fan beam planes and mirror positions corresponding to detector times of arrival. As is familiar to those skilled in the art, the reflected beam angle with respect to the mirror normal is equal to the incident beam angle. Detector position is computed as the intersection of three beam planes, as is a well known procedure to those skilled in the art. The positions of three detectors are used to define a plane, from which the sensor orientation is determined, also a familiar procedure to those skilled in the art. In this way, the sensor position and orientation (6DOF) is determined.

(7) In a second embodiment of the present invention, motor means comprises separate drive motors, each of which carries reflector means comprising a mirror with the drive shafts of the motors preferably being parallel to one another and with the reflective surfaces of the mirrors lying in either common planes or parallel planes. In this regard, at two positions of the respective drive shafts of the motors, reflective surfaces of the mirrors lie in common planes. As the mirrors rotate from those positions, at other orientations thereof, the mirrors lie in parallel planes.

(8) In the same way as is the case in the first embodiment, fan-shaped beams are generated through stationary sources of laser beams that are directed at the reflective surfaces of the mirrors and thence reflect into the measuring space. Each mirror may consist of a single reflective surface or a plurality of reflective surfaces such as two opposed surfaces or four surfaces where each reflective surface is related to adjacent reflective surfaces by a right angle.

(9) In the control means of the present invention electrical circuitry is incorporated in the second embodiment and provided with knowledge of the rotative position of each shaft and reflective surface and the sensor detects times of arrival of the various fan-shaped beams. With the shafts of the two motors spaced sufficiently apart and with at least two of the fan-shaped beams skewed with respect to one another, the control means is programmed so that triangulation may be carried out to determine the position and orientation of an object within the measuring space.

(10) Computing means determine reflected fan beam planes from knowledge of incident fan beam planes and mirror positions corresponding to detector times of arrival.

As is familiar to those skilled in the art, the reflected beam angle with respect to the mirror normal is equal to the incident beam angle. Detector position is computed as the intersection of three beam planes, as is a well known procedure to those skilled in the art. The positions of three detectors are used to define a plane, from which the sensor orientation is determined, also a familiar procedure to those skilled in the art. In this way, the sensor position and orientation (6DOF) is determined.

As such, it is a first object of the present invention to provide position and orientation determination using stationary fan beam sources and rotating mirrors to sweep fan beams.

It is a further object of the present invention to provide such a system wherein, in a first embodiment thereof, mirrors are rotatably mounted on a common shaft rotated by a single motor.

It is a still further object of the present invention to provide such a system in a second embodiment thereof in which a plurality of motors are provided with their shafts parallel to one another and with each shaft rotating a mirror having one or more reflective surfaces.

It is a still further object of the present invention to provide such a system wherein, in each embodiment thereof, the angular position of the motor shaft or shafts is/are known.

It is a still further object of the present invention to provide such a system wherein knowledge of rotative shaft position and times of arrival of fan-shaped beams at an object are used to measure position and orientation of the object in a measuring space or work area.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
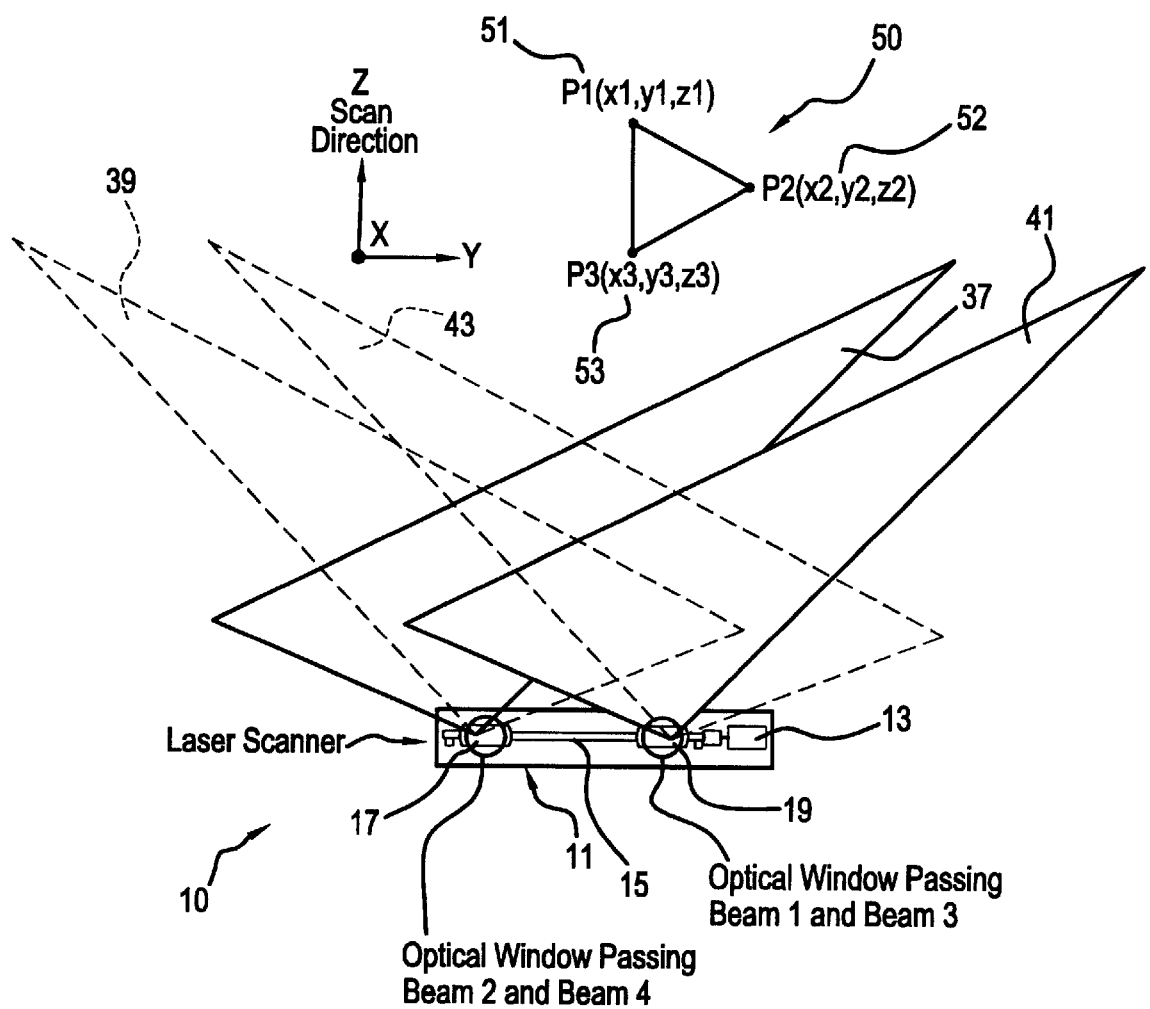
FIG. 1 shows a schematic representation of a first embodiment of the present invention.

With reference, first, to FIGS. 1–4, the structural details of a first embodiment of the present invention will now be described. As seen in these figures, the system is generally designated by the reference numeral 10 and is seen to include a scanner housing 11 on which is mounted a motor 13 having a shaft 15 to which are affixed two mirrors 17 and 19.

Figure 2:
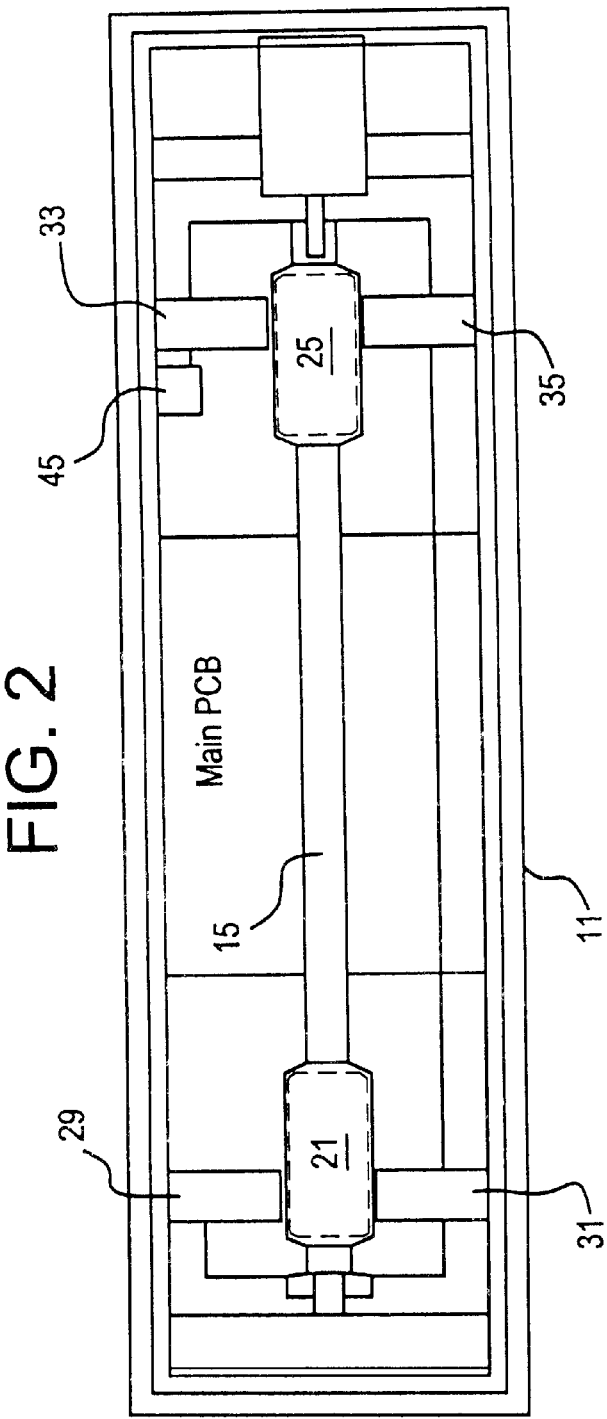
FIG. 2 shows a front view of the fan-shaped beam generating system of the embodiment of FIG. 1.
Figure 3:
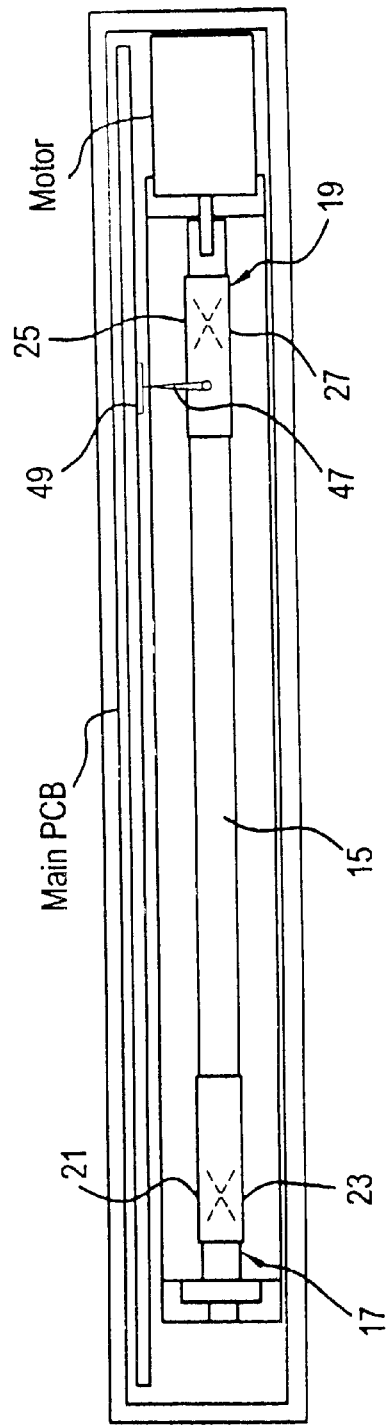
FIG. 3 shows a top view of the beam generating subsystem of the first embodiment of the present invention.

With particular reference to FIGS. 2 and 3, it is seen that the mirror 17 includes two reflective faces 21 and 23 which face in diametrically opposite directions. The face 21 is seen in FIG. 2. Similarly, the mirror 19 includes faces 25 and 27 which face in diametrically opposite directions with the face 25 seen in FIG. 2.

With further reference to FIG. 2, in particular, the housing 11 includes four laser beam sources numbered 29, 31, 33 and 35, respectively. With reference to FIG. 1, the laser beams reflect from the mirrors 17 and 19 to form the fan-shaped beams illustrated in FIG. 1. Thus, for example, the beam 29 reflects off one of the faces 21, 23 of the mirror 17 to create the beam 37. Similarly, the laser beam 31 reflects off one of the faces of the mirror 17 to create the beam 39. In a similar fashion, the laser beam 33 reflects off one of the faces of the mirror 19 to create the beam 41, and the laser beam 35 reflects off one of the faces of the mirror 19 to create the fan-shaped beam 43.

Figure 4:
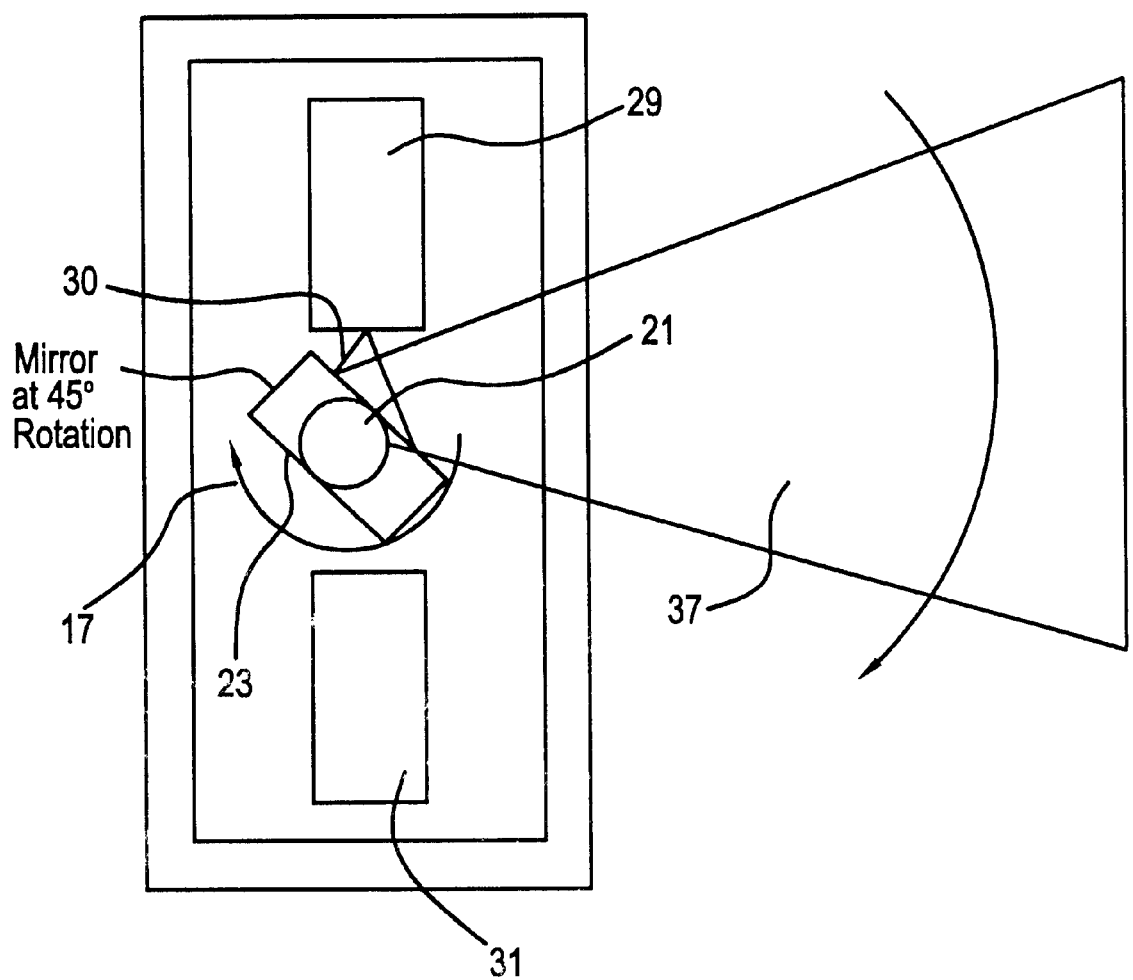
FIG. 4 shows a side view of the beam generating subsystem of the first embodiment of the present invention.

With reference to FIG. 4, the mirror 17 is shown with its faces 21 and 23, and the laser beam generator 29 is seen with an incident fan beam 30 emanating therefrom, and reflecting to form the beam 37. FIG. 4 should be considered exemplary.

With reference, in particular, to FIGS. 2 and 3, it is seen that the system also includes a reference laser beam generator 45, which generates a laser beam designated by the reference numeral 47 in FIG. 3, which is received by the reference detector 49. The reference laser beam generator 45, the beam 47, and detector 49 are provided to allow the inventive system to closely monitor the rotative position of the shaft 15. For this purpose, one or more indicia (not shown) may be provided about the circumference of the shaft 15 to be detected by the beam 47 with information responsive to such detection being conveyed to the detector 49. If desired, a shaft angular reference or fiduciary mark is generated by sensing the mirror facet orientation optically. Alternatively, if desired, a disk encoder may be attached to the shaft 15 for this purpose.

In the first embodiment of the present invention as illustrated in FIGS. 1–5, four scanning fan-shaped beams are employed having stationary points of origin as represented by the fixed laser beam sources 29, 31, 33 and 35. In the embodiment of FIG. 1, two parallel beams are skewed 25° from the scan axis, and two parallel beams are skewed -25° from the scan axis. Each parallel pair of beams is separated by a distance of about 6 inches or so. The +25° lasers are mounted on opposite sides of the scanning mirrors from the -25° lasers, so that the two scans occur during separate periods about the 360° circumference of the shaft. In the example shown, as explained hereinabove, each mirror has two faces or facets which are diametrically opposed, for example, the faces or facets 21 and 23. In this configuration, the measurement space may be swept twice per shaft revolution with fan-shaped beams.

As should be understood by those skilled in the art, the use of four intersecting fan-shaped laser beams provides a redundant solution of the position and orientation of a detector in space. However, the fourth plane significantly improves triangulation capability over the use of three planes. Where retro-reflectors are used instead of detectors, the fourth plane is required to test three plane combinations since the target responsible for causing the reflection is not specifically known.

With reference back to FIG. 1, the sensor is generally designated by the reference numeral 50 and is seen to be triangular in shape with three corners designated as follows:

$P_1 (X_1, Y_1, Z_1)$; $P_2 (X_2, Y_2, Z_2)$; and $P_3 (X_3, Y_3, Z_3)$. The sensor 50 is affixed to the object, the position and orientation of which are to be measured.

Where retro-reflective targets are to be employed, a detector is placed in close proximity to each laser beam source to record reflections caused by the adjacent laser beam. The position and orientation sensor designated by the reference numeral 50 consists of at least three active detectors or retro-reflectors. The position of at least three points in space must be measured in order to determine orientation.

Figure 5:
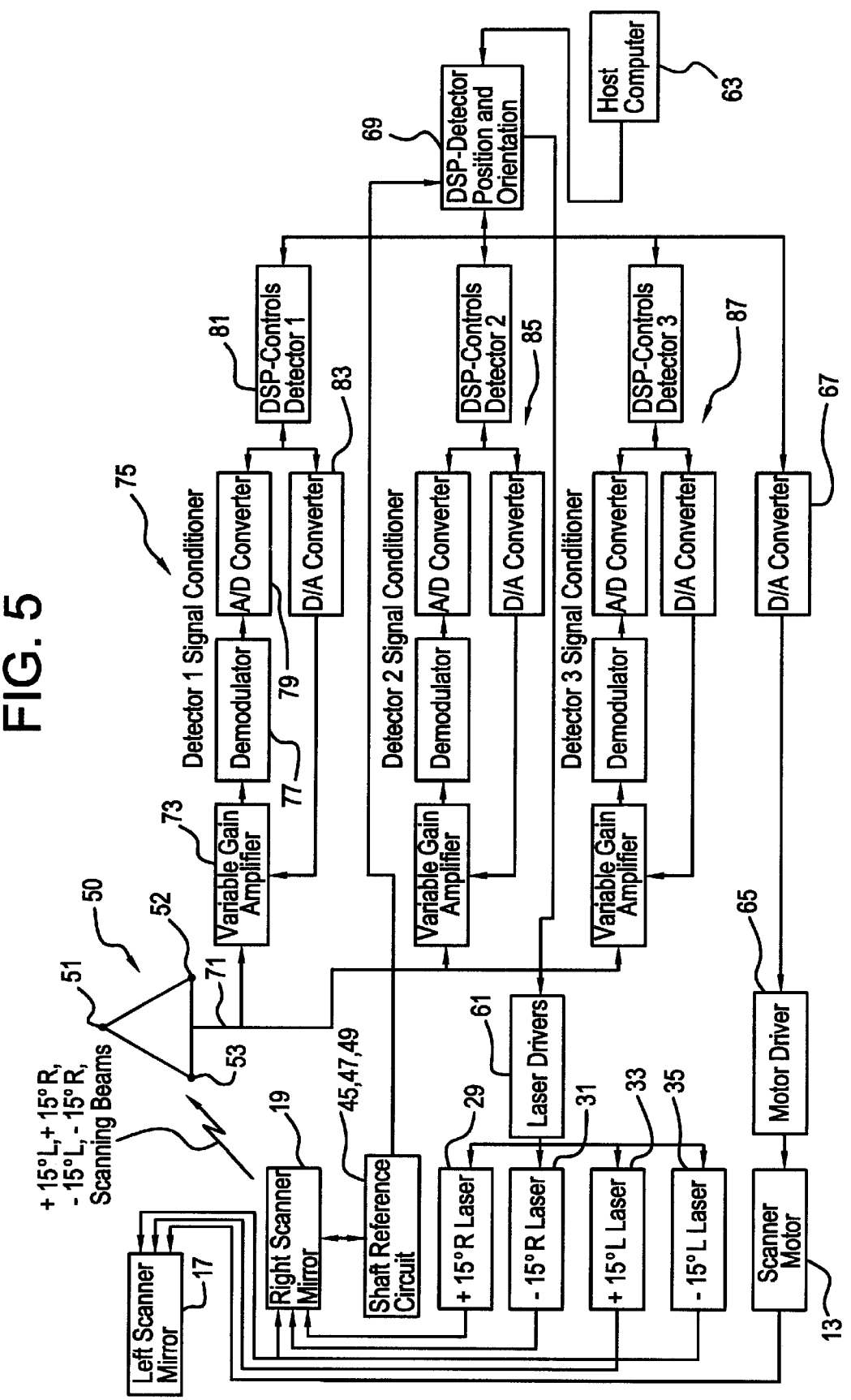
FIG. 5 shows a schematic representation of the electrical circuitry of the first embodiment of the present invention.

With reference to FIG. 5, a schematic representation of the first embodiment of the present invention is shown. As understood from FIG. 5, the sensor 50 consists of three detectors 51, 52 and 53 corresponding to the corners $P_1$, $P_2$ and $P_3$. With reference to FIG. 5, it is seen that the laser beam generators 29, 31, 33 and 35 are controlled by a laser driver 61 receiving signals from a host computer 63. The host computer also controls a motor driver 65 via a D/A converter 67 and a DSP-detector position and orientation device 69.

With further reference to FIG. 5, it is seen that the sensor 50 is interconnected with the circuit through the use of a sensor cable 71. Of course, as well known to those skilled in the art, the interconnection between the sensor 50 and the electrical circuitry can be made wireless through the use of appropriate transmitter-receiver sub-circuitry. Taking the example of detector 1, designated by the reference numeral 51, signals received therefrom are amplified by a variable gain amplifier 73 and are sent to a signal conditioner 75 consisting of a demodulator 77 and an A/D converter 79, and are then transmitted to a DSP 81 that computes detector event centroids. Feedback signals are sent back to the variable gain amplifier 73 via a D/A converter 83, so that the gain on the amplifier 73 may be suitably adjusted responsive to sensing of the strength of the signal received. Signals from the DSP-centroids detector 1 sub-circuit 81 are sent to the sub-circuit 69 and thence to the host computer 63. The detectors 52 and 53 have substantially identical circuitry connecting them to the host computer 63 as designated by the respective reference numerals 85 and 87.

The signals sent from the detectors 51, 52 and 53 to the host computer 63 via the sub-circuits described above consist of information relating to times of arrival of the various fan-shaped beams generated by the laser beam generators 29, 31, 33 and 35. Simultaneously, the shaft reference circuit 45, 47, 49 transmits to the host computer 63 instantaneous information concerning the instantaneous rotative position of the drive shaft 15. With this information in hand, the host computer can calculate position and orientation in a manner that should be well understood.

Computing means determine reflected fan beam planes from knowledge of incident fan beam planes and mirror positions corresponding to detector times of arrival. As is familiar to those skilled in the art, the reflected beam angle with respect to the mirror normal is equal to the incident beam angle. Detector position is computed as the intersection of three beam planes, as is a well known procedure to those skilled in the art. The positions of three detectors are used to define a plane, from which the sensor orientation is determined, also a familiar procedure to those skilled in the art. In this way, the sensor position and orientation (6DOF) is determined.

Figure 6:
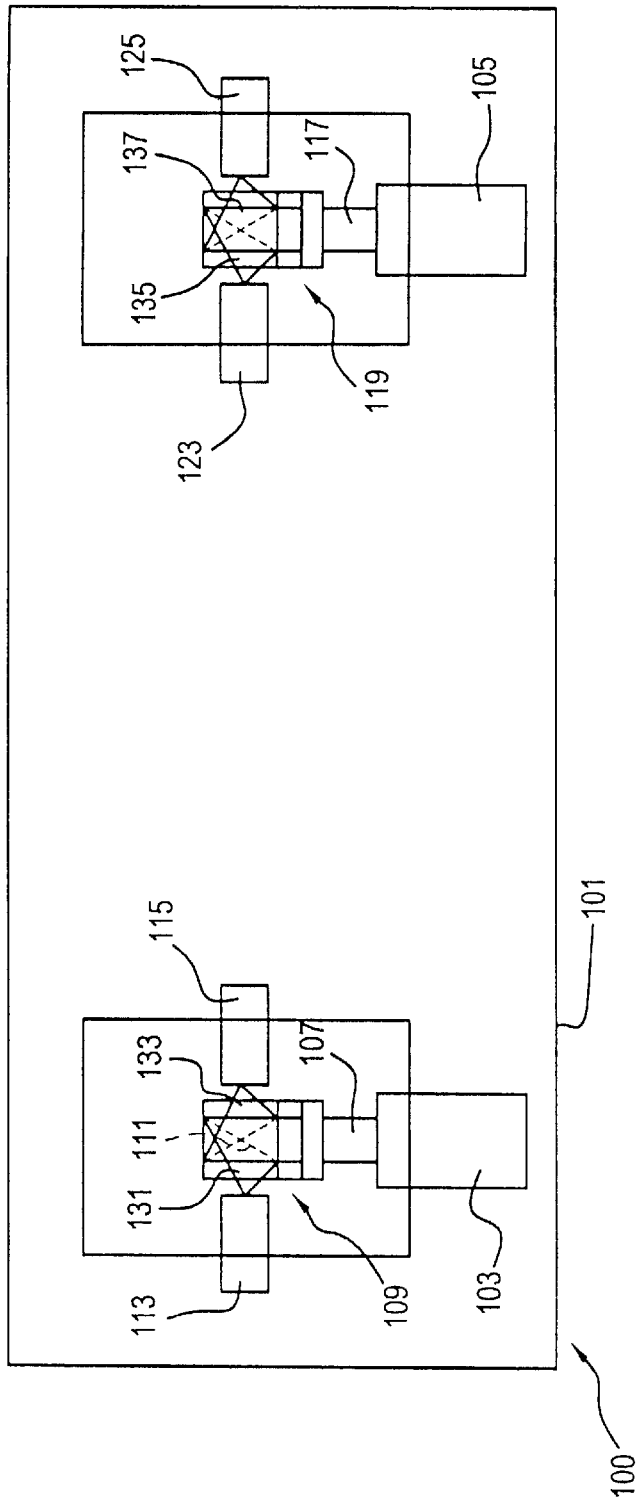
FIG. 6 shows a front view of a second embodiment of fan-shaped beam generating subsystem.
Figure 7:
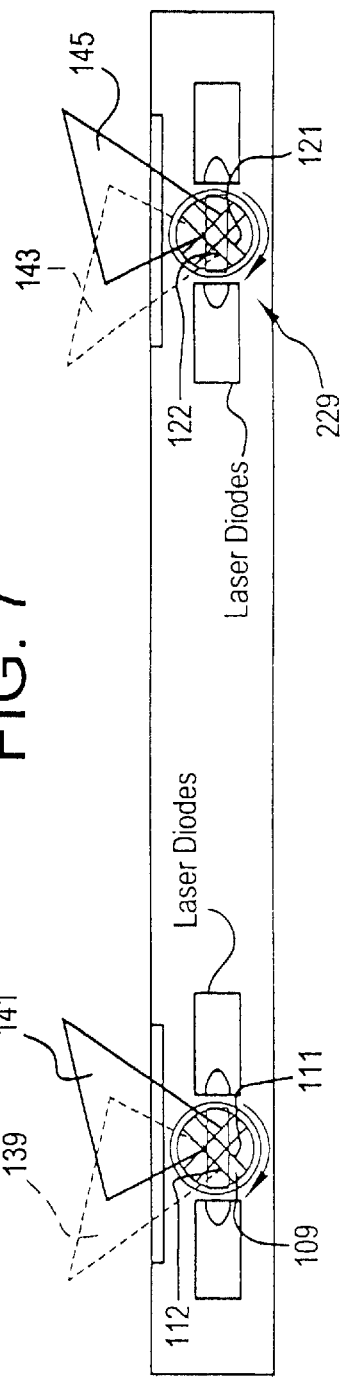
FIG. 7 shows a top view of a second embodiment of fan-shaped beam generating subsystem.

With reference, now, to FIGS. 6 and 7, a second embodiment of the present invention will now be described in detail. With reference, first, to FIG. 6, it is seen that the system is generally designated by the reference numeral 100 and is seen to include a scanner housing 101 in which two motors 103 and 105 are mounted. The motor 103 has a drive shaft 107 to which is mounted a mirror 109 which includes, in the embodiment shown, two diametrically opposed faces 111 and 112 as best seen in FIG. 7. Laser beam generators 113 and 115 face the mirror 109 from opposite sides thereof. In a similar fashion, the motor 105 has a drive it shaft 117 parallel to the drive shaft 107 of the motor 103. The drive shaft 117 carries a mirror 119 which includes opposed reflective faces 121 and 122.

A pair of laser beam generators 123 and 125 face toward the mirror 119 from opposite sides. FIG. 6 schematically shows incident fan beams 131 and 133 emanating from the laser beam generators 113 and 115, respectively, as well as the incident fan beams 135 and 137 emanating from the laser beam generators 123 and 125, respectively. FIG. 7 shows the reflected fan beams 139, 141, 143 and 145 as they emanate from the mirrors 109 and 119 and travel into the space where a sensor (not shown, but the same as the sensor 50) is located.

Figure 8:
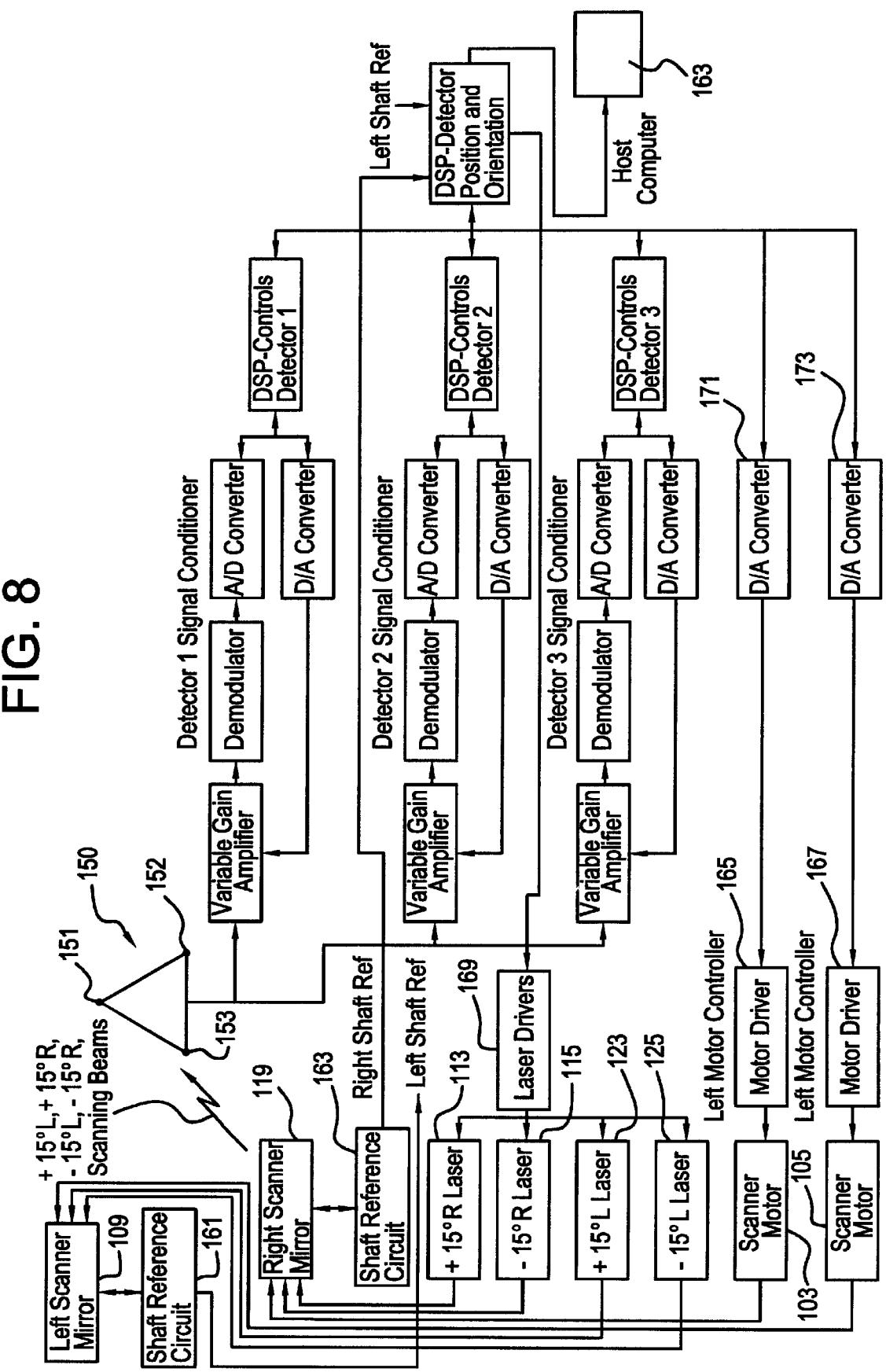
FIG. 8 shows a schematic representation of the electrical circuitry for the second embodiment of the present invention.

The sensor 150 is shown in FIG. 8 and includes detectors 151, 152 and 153 (or, alternatively, retro-reflectors). With further reference to FIG. 8, the reference numerals from FIGS. 6 and 7 are reproduced therein. Although not shown in FIGS. 6 and 7, FIG. 8 schematically refers to the shaft reference circuits 161 (for the motor 105) and 163 (for the motor 103). The shaft reference circuits 161 and 163 operate in the same manner as the shaft reference circuit 45, 47, 49, depicted in FIGS. 1–5, and provides the host computer 163 with information as to the rotative position of the drive shafts 107, 117, at any given moment. The motor drivers 165 and 167 operate in analogous fashion to the motor driver 65 depicted in FIG. 5. The laser driver 169 operates in analogous fashion to the laser driver 61 shown in FIG. 5. Control signals to the motor drivers travel from the host computer 163 via D/A converters 171 and 173. The operation of the sub-circuits receiving signals from the detectors 151, 152 and 153 is the same as shown in FIG. 5, and there is no need to provide reference numerals in association with those components. The sub-circuits for the detectors 151, 152 and 153 receive signals related to times of arrival of the fan-shaped beams at each detector. With knowledge of that information and with information from the shaft reference circuits 161, 163, concerning the particular rotative positions of the shafts 107 and 117, the host computer 163 can calculate the position and orientation of the sensor 150 as attached to an object within a work space. Where retro-reflectors are employed, signal receivers are located adjacent each laser beam source in the same way as set forth regarding the embodiment of FIGS. 1–5.

In the preferred set-up for the second embodiment illustrated in FIGS. 6–8, the shafts 107 and 117 are parallel to one another, with beam fan angles of approximately +and −30° skew with respect to the scanning axis. As compared to the embodiment illustrated in FIGS. 1–5, the second embodiment has enhanced performance under situations where it is desired to separate the shafts 107 and 117 a greater distance to permit longer range operation. Of course, the use of two motors and shafts complicates the circuitry with the need to record two shaft positions and to calibrate the position and orientation of each scanning unit. There is a possibility that asynchronous scanning of the two units might introduce certain ambiguities into the measurements, and additional complication involves accurately synchronizing the rotation speeds of the motors 103 and 105, and the shaft positions thereof. As is the case with the embodiment of FIGS. 1–5, the embodiment of FIGS. 6–8 may easily be modified by those skilled in the art to provide wireless interconnection between the sensor 150 and the rest of the circuitry thereof. Additionally, alternatively, instead of the use of detectors 151, 152 and 153, retro-reflectors could be substituted with detectors placed adjacent the location of emanation of the laser beams from the mirrors.

In each embodiment, direct or retro-reflector detected signals from the four channels (corresponding to four fan-shaped beams) are amplified, demodulated, and converted from analog to digital signals. Signal activity above a processor selected threshold is digitized, sampled and stored in a memory along with the associated time of occurrence, namely, the exact time at which each beam is received by the respective sensor. The computer 63 or 163 reads data from memory and reduces the data captured in one revolution of a shaft or shafts to a set of beam centroid amplitudes and "time stamps". The scanner processor transmits centroid data serially to the computer 63 or 163 which may be provided with a software driver for performing sensor position and orientation calculations in a manner well known to those skilled in the art.

In this way, position and orientation determinations may be had with a simplicity and accuracy unknown in the prior art.

As such, an invention has been disclosed in terms of preferred embodiments which fulfill each and every one of the objects of the invention as set forth hereinabove, and provide a new and useful position and orientation determination system using stationary fan beam sources and rotating mirrors to sweep fan beams of great novelty and utility.

Of course, various changes, modifications and alterations in the teachings of the present invention may be contemplated by those skilled in the art without departing from the intended spirit and scope.

As such, it is intended that the present invention only be limited by the terms of the appended claims.

What is claimed is:

1. A system for determining the position and orientation of an object within a space, comprising:
    a) at least three fixed sources of light beams, a plane of at least one of said sources being skewed with respect to a plane of at least another one of said sources;
    b) means for moving said light beams in said space in prescribed patterns of movement, said moving means comprising motor means for rotating drive shaft means comprising a single drive shaft, reflector means mounted on said drive shaft means for reflecting light from said at least three sources of light beams, said reflector means comprising a first reflective surface means for reflecting light from a plurality of light beam sources and at least a second reflective surface means for reflecting light from at least one additional light beam source;
    c) sensor means associated with an object in said space for sensing time of arrival of each light beam at said object, said sensor means sending arrival signals indicative of said times of arrival;
    d) control means for receiving said arrival signals, said control means being programmed with data regarding said patterns of movement and from said arrival signals and data calculating position and orientation of said object.

2. The system of claim 1, wherein said ref lector means reflects said beams into said space, rotation of said reflector means moving said beams in said prescribed patterns.

3. The system of claim 2, wherein said motor means comprises a single motor, said shaft means comprising a single shaft rotated by said motor.

4. The system of claim 1, wherein said reflector means comprises a mirror mounted on said shaft.

5. The system of claim 1, wherein said reflector means comprises a plurality of mirrors mounted on said shaft.

6. The system of claim 5, wherein said mirrors lie in a common plane.

7. The system of claim 5, wherein said mirrors face in opposite directions.

8. The system of claim 5, wherein said plurality of mirrors comprise four mirrors.

9. The system of claim 2, wherein said motor means comprises two motors, said shaft means comprising a separate shaft rotated by each of said motors.

10. The system of claim 9, wherein said reflector means comprises a mirror mounted on each shaft.

11. The system of claim 9, wherein said reflector means comprises a plurality of mirrors mounted on each shaft.

12. The system of claim 11, wherein mirrors mounted on each shaft are co-planar.

13. The system of claim 11, wherein mirrors mounted on each shaft face in opposite directions.

14. The system of claim 11, wherein said plurality of mirrors on each shaft comprise four mirrors.

15. The system of claim 11, wherein mirrors on at least one of said shafts are co-planar.

16. The system of claim 11, wherein mirrors on at least one of said shafts face in opposite directions.

17. The system of claim 1, wherein said sensor means comprises three light detectors mounted on said object.

18. The system of claim 1, wherein said sensor means comprises three retro-reflectors mounted on said object and light detector means located adjacent said moving means for detecting light reflected from said retro-reflectors.

19. The system of claim 18, wherein said moving means comprises a plurality of rotating mirrors and said light detector means comprises a light detector located adjacent each mirror.

20. The system of claim 1, wherein said control means comprises a computer.

21. The system of claim 9, wherein said shafts are parallel.

22. A method for determining the position and orientation of an object within a space including the steps of:
    a) providing at least three fixed sources of light beams, an axis of at least one of said sources being skewed with respect to an axis of at least another one of said sources;
    b) providing means for moving said light beams in said space in prescribed patterns of movement, said moving means comprising motor means for rotating drive shaft means comprising a single drive shaft, reflector means mounted on said drive shaft means for reflecting light from said at least three sources of light beams, said reflector means comprising a first reflective surface means for reflecting light from a plurality of light beam sources and at least a second reflective surface means for reflecting light from at least one additional light beam source;
    c) providing sensor means associated with an object in said space for sensing time of arrival of each light beam;
    d) programming control means with data regarding said patterns of movement;
    e) moving said light beams in said prescribed patterns of movement;
    f) sensing time of arrival of each light beam at said object;
    g) conveying information regarding said times of arrival to said control means;

h) from said data and information, calculating position and orientation of said object.

23. The method of claim 22, wherein said reflector means reflects said beams into said space, rotation of said reflector means moving said beams in said prescribed patterns.

24. The method of claim 23, wherein said motor means comprises a single motor, said shaft means comprising a single shaft rotated by said motor.

25. The method of claim 23, wherein said reflector means comprises a mirror mounted on said shaft.

26. The method of claim 23, wherein said reflector means comprises a plurality of mirrors mounted on said shaft.

27. The method of claim 26, wherein said mirrors lie in a common plane.

28. The method of claim 26, wherein said mirrors face in opposite directions.

29. The method of claim 23, wherein said motor means comprises two motors, said shaft means comprising a separate shaft rotated by each of said motors.

30. The method of claim 29, wherein said separate shafts are parallel.

31. The method of claim 29, wherein said reflector means comprises a mirror mounted on each shaft.

32. The method of claim 29, wherein said reflector means comprises a plurality of mirrors mounted on each shaft.

33. The method of claim 32, wherein mirrors mounted on each shaft are co-planar.

34. The method of claim 32, wherein mirrors mounted on each shaft face in opposite directions.

35. The method of claim 32, wherein mirrors on at least one of said shafts are co-planar.

36. The method of claim 32, wherein mirrors on at least one of said shafts face in opposite directions.

* * * * *